United States Patent [19]

Ohtsuka

[11] 3,886,176

[45] May 27, 1975

[54] PROCESS FOR PREPARING IMIDAZOLE-4,5-DICARBOXAMIDE

[75] Inventor: Yozo Ohtsuka, Kanagawa, Japan

[73] Assignee: Sagami Chemical Research Center, Tokyo, Japan

[22] Filed: Feb. 26, 1974

[21] Appl. No.: 446,087

[30] Foreign Application Priority Data

Feb. 26, 1973 Japan.............................. 48-22145

[52] U.S. Cl. ............................................... 260/309
[51] Int. Cl........................................... C07d 49/36
[58] Field of Search ..................................... 260/309

[56] References Cited
UNITED STATES PATENTS 2,522,854  9/1950  Brink et al...................... 260/309.2
2,534,331  12/1950  Woodward......................... 260/309
3,808,225  4/1974  Asai................................. 260/309

OTHER PUBLICATIONS

Bredereck et al., Ann. Chem. 600: 105 (1956).

*Primary Examiner*—Henry R. Jiles
*Assistant Examiner*—S. D. Winters
*Attorney, Agent, or Firm*—Sughrue, Rothwell, Mion, Zinn & Macpeak

[57]  ABSTRACT

A process for preparing imidazole-4,5-dicarboxamide which comprises heating (1) diaminomaleonitrile and formic acid or (2) monoformyldiaminomaleonitrile in formamide as a reaction medium is disclosed.

4 Claims, 1 Drawing Figure

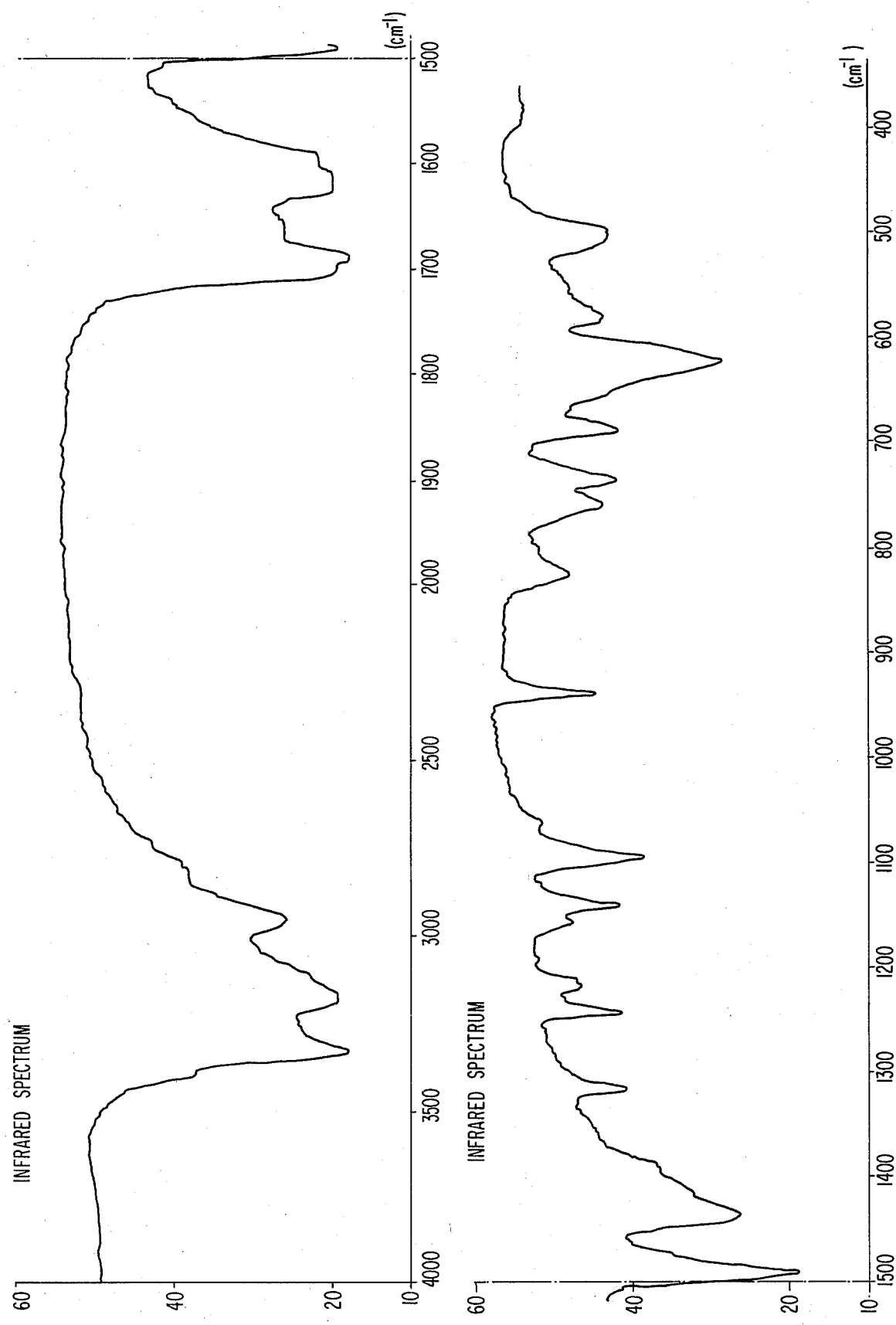

PROCESS FOR PREPARING IMIDAZOLE-4,5-DICARBOXAMIDE

BACKGROUND OF THE INVENTION

1. Field of the Invention

This invention relates to a novel process for preparing imidazole-4,5-dicarboxamide represented by the formula

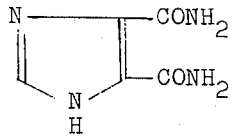

which comprises heating (1) diaminomaleonitrile and formic acid or (2) monoformyldiaminomaleonitrile in formamide as a reaction medium.

2. Description of the Prior Art

It is well known that imidazole-4,5-dicarboxamide, which is also known as "glycarbylamide," has per se an antimicrobial activity and can be converted into xanthine or 9-substituted derivatives thereof by subjecting imidazole-4,5-dicarboxamide to the Hofmann rearrangement without loss of carbon atoms as disclosed in R. A. Barter, F. S. Spring, Nature, 154, 492 (1944). Further, imidazole-4,5-dicarboxamide is an intermediate useful for the preparation of a wide variety of pharmaceuticals and agricultural agents such as antifeins, antimicrobial agents, herbicides, antitumor agents which can be derived from imidazole-4,5-dicarboxamide via relatively simple chemical reactions.

It was known that imidazole-4,5-dicarboxamide can be prepared by (1) hydrolysis of imidazole-4,5-dicarbonitrile as disclosed in D. W. Woodward, U.S. Pat. No. 2,534,331 (1950) and Y. Yamada, I. Kumashiro and T. Takenishi, Bull. Chem. Soc., Japan, 41, 1237 (1968) or (2) conversion of imidazoledicarboxylic acid (Org. Syn., 22, 45) through its diester form as described in R. A. Baxter and F. S. Spring, J. Chem. Soc., 232 (1945).

However, the above well-known processes have disadvantages in that the starting material used in these conventional processes are not easily available and the processes require complicated multiple steps thereby making such conventional processes unsuitable for the production of imdiazole-4,5-dicarboxamide on an industrial scale. For example, diaminomaleonitrile used as a starting material in the conventional process (1) above is prepared by reacting diaminomaleonitrile with orthoester or imidate both of which are relatively expensive reagents and, in addition, procedures involved in the above reaction are not suitable for the production of imidazole-4,5-dicarboxamide on an industrial scale. Also, the conventional process (2) above requires complicated steps and is not applicable to the production in industry.

BRIEF DESCRIPTION OF THE ACCOMPANYING DRAWING

The FIGURE is a graph showing an infrared absorption spectrum of imidazole-4,5-dicarboxamide measured by the KBr-disc method on the product obtained in accordance with the process of this invention. The abscissa represents the wave number and the ordinate represents the percent transmission.

SUMMARY OF THE INVENTION

An object of the present invention is therefore to provide a novel process for preparing imidazole-4,5-dicarboxamide which is easy to operate.

Another object of this invention is to provide an economical process for preparing imidazole-4,5-dicarboxamide.

DETAILED DESCRIPTION OF THE INVENTION

As a result of extensive researches for a process for preparing imidazole-4,5-dicarboxamide which is applicable to the production of the dicarboxamide on an industrial scale and which would eliminate the disadvantages associated with the conventional processes, it was found that imidazole-4,5-dicarboxamide can be prepared by simply heating diaminomaleonitrile and formic acid or monoformyldiaminomaleonitrile, which is easily obtained in high yield by reacting diaminomaleonitrile with formic acid, in a formamide as a reaction medium.

Although the reaction mechanism of the process of this invention is not fully understood and not desiring to be bound, the reaction is believed to proceed by the following reaction scheme.

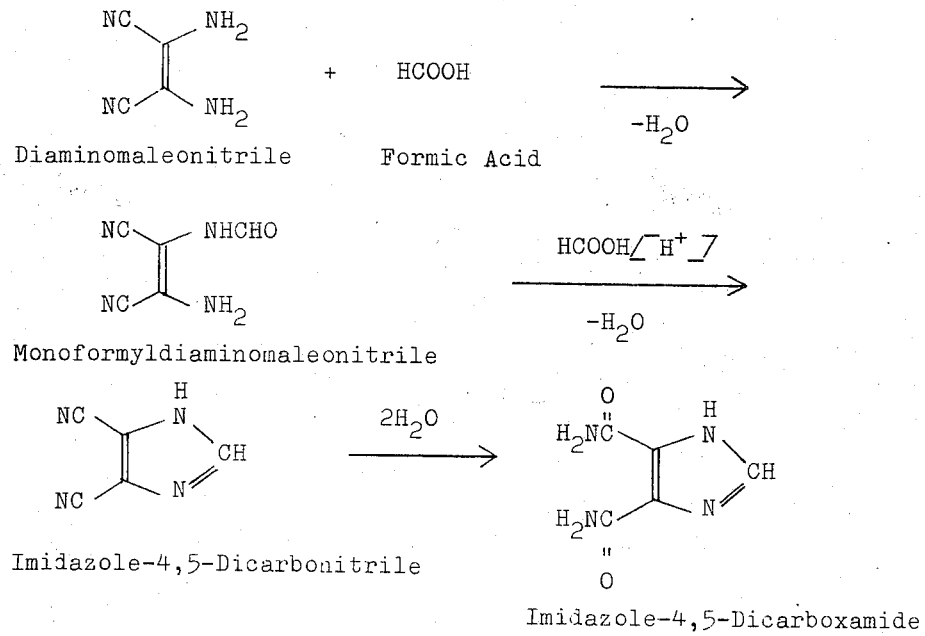

It has not yet been reported that the nitrile groups on straight chain diaminomaleonitrile or derivatives thereof can be converted into the corresponding amides through hydrolysis of the nitrile groups. However, since it is well known that imidazole-4,5-dicarbonitrile is easily converted into imidazole-4,5-dicarboxamide as shown in the last step of the above reaction scheme, the reaction of this invention is considered to proceed via cyclization of monoformyldiaminomaleonitrile. As shown in the above reaction scheme, two moles of water are required theoretically for the conversion of one mole of imidazole-4,5-dicarbonitrile into the desired imidazole-4,5-dicarboxamide. This requisite water is believed to be supplied from either the reaction system, i.e., a small amount of water contained in the solvent (formamide) and reactants as an impurity, water formed during the reaction between diaminomaleonitrile and formic acid, and water produced by the decomposition of formic acid, or water used in the subsequent washing or water contained in the air.

One of the starting materials, diaminomaleonitrile, used in the process of this invention is easily available as a commercial product in the chemical industry. Also, monoformyldiaminomaleonitrile used as an alternative starting material can easily be prepared in high yield on an industrial scale from diaminomaleonitrile by reaction with formic acid in a non-polar solvent as described in the applicant's copending U.S. Pat. application Ser. No. 413,063 filed Nov. 5, 1973 and entitled "Process for Preparing Monoformyldiaminomaleonitrile".

In carrying out the process of this invention, the reaction between diaminomaleonitrile and formic acid can be effected using about 1 to about 4 moles of formic acid per 1 mole of diaminomaleonitrile. The maximum yield of the desired product can generally be obtained when about 2 moles of formic acid is used per 1 mole of diaminomaleonitrile.

The heating of the monoformyldiaminomaleonitrile or a mixture of diaminomaleonitrile and formic acid is generally carried out at a temperature of from about 150°C to about 220°C, preferably from 180°to 215°C, most preferably at about 200°C, for a period of from about 10 minutes to about 10 hours. As is apparent to those skilled in the art, the higher the temperature the shorter the heating period. At a temperature below about 150°C, the reaction does not proceed smoothly, and at a temperature higher than about 220°C, formic acid tends to be decomposed.

The use of formamide as a reaction medium is a critical feature in the process of this invention. The concentration of the reactant or reactants in formamide in the range of from 1to 8 percent (weight/volume). A higher or lower concentration can be used without causing any serious problems on the reaction and the product.

Although it is not essential, the reaction of this invention may be carried out in an inert atmosphere such as under nitrogen gas or other inert gases when formic acid tends to be heat-decomposed at the reaction temperature, in particular, in the case of using a relatively high temperature.

The isolation and recovery of the desired product from the reaction mixture can be effected by the conventional procedures which are well known in the art, for example, allowing the reaction mixture to cool to precipitate the product and separating the thus precipitated product by filtration or removing the formamide from the reaction system under reduced pressure to leave the product as a residue, washing the product with water or alcohols such as ethanol and the like, if necessary, purifying the product by dissolving the crude product in an aqueous solution of a weak alkali such as sodium carbonate and adding an acid such as hydrochloric acid to recrystallize the purified product.

The present invention is further illustrated by the following examples but they are not to be construed as limiting the scope of the invention.

EXAMPLE 1

In an open vessel, 4 g of diaminomaleonitrile and 5 ml of formic acid in 140 ml of formamide were stirred for 30 minutes at room temperature and then heated in an oil bath at a temperature of about 200°C for one hour. The resulting reaction mixture was allowed to cool and the precipitated crystals were separated by filtration, washed with ethanol to obtain 4.35 g of a light brown solid as a first crop. The filtrate was concentrated under reduced pressure to a residue, and 30 to 50 ml of ethanol was added to the residue. The precipitates thus produced was then filtered and washed with ehtanol to obtain 1.25 g of a solid as a second crop. The first and second crops were combined and dissolved in a hot 10 percent aqueous solution of sodium carbonate. After allowing to cool, a diluted hydrochloric acid was added to the solution to render the solution neutral and the precipitated crystals were filtered and dried to obtain 5.2 g (91 percent yield) of purified imidazole-4,5-dicarboxamide. The infrared absorption spectrum of the resulting crystals was found to be fully consistent with that of an authentic sample of imidazole-4,5-dicarboxamide.

EXAMPLE 2

In a 300 ml flask equipped with a 30 cm length glass tube as an air-cooling condenser, 1.36 g of monoformyldiaminomaleonitrile was heat-refluxed in 100 ml of a commercially available formamide (a water content, 1 percent) at a temperature of 211°C for 2 hours. After allowing to cool, formamide was removed from the reaction mixture under reduced pressure and the resulting residue was washed with warm water and filtered. The filter cake thus obtained was then purified in the same manner as described in Example 1, and the resulting precipitate was recovered and dried to obtain 1.0 g (65 percent yield) of imidazole-4,5-dicarboxamide having a melting point of above 300°C. The infrared absorption spectrum of the resulting product was found to be fully consistent with that of an authentic sample of the same compound.

What is claimed is:

1. A process for preparing imidazole-4,5-dicarboxamide which comprises heating diaminomaleonitrile and formic acid in formamide as a reaction medium at a temperature in the range of from about 150°C to about 220°C for a period of from about 10 minutes to about 10 hours in a molar ratio of about 1 to about 4 moles of formic acid per 1 mole of diaminomaleonitrile.

2. The process according to claim 1, wherein said temperature is in the range of from 180°C to 215°C.

3. A process for preparing imidazole-4,5-dicarboxamide which comprises heating monoformyldiaminomaleonitrile in formamide as a reaction medium at a temperature in the range of from about 150°C to about 220°C for a period of from about 10 minutes to about 10 hours.

4. The process according to claim 3, wherein said temperature is in the range of from 180°C to 215°C.

* * * * *